Patented July 17, 1951

2,560,707

UNITED STATES PATENT OFFICE 2,560,707

SOLS

Henry Moroni Stark, Wilmington, Del., assignor to E. I. du Pont de Nemours & Company, Wilmington, Del., a corporation of Delaware No Drawing. Application May 20, 1948,
Serial No. 28,278

4 Claims. (Cl. 252—313)

This invention relates to the production of aqueous colloidal dispersions of alumina hydrate, and more particularly to the production of aqueous colloidal alumina sols of improved stability.

When aqueous dispersions of hydrous oxides (including alumina hydrate which has not been peptized) are subjected to freezing, the usual result is a coagulation or flocculation of the hydrous oxide particles.

This invention has as an object the preparation of colloidal alumina sols of increased stability. Other objects will appear hereinafter.

These objects are accomplished by the present invention wherein a previously peptized, visually homogeneous, colloidal aqueous dispersion of alumina hydrate (which may be in either the sol or the gel form) is maintained below the freezing point of the dispersion for a sufficient length of time to convert the dispersion into a rigid solid mass, i. e., the sol or gel is frozen and then thawed by heating the rigid solid mass until a fluid sol of improved stability is obtained.

In one method of preparing the stable alumina sols of this invention, alumina hydrate is precipitated by mixing aqueous solutions of aluminum chloride and ammonium hydroxide. The precipitate is collected on a filter and is washed with water until 96–97% of the chloride ion originally present is removed. The precipitate is then agitated until a slurry is formed and the slurry is peptized by heating for one to two hours at 90–95° C. The resulting colloidal suspension then is passed through a colloid mill and the dispersion is subsequently centrifuged. The alumina sol thus formed is then subjected to a temperature of about −20° C. for about seven hours, after which the chilled mass is again allowed to return to room temperature (20–25° C.). An alumina sol of improved stability is thereby obtained. Peptized alumina sols prepared by other methods, e. g., as in U. S. Patent 2,085,129; J. Phys. Chem. 35, 29 (1931); or J. Phys. and Coll. Chem. 51, 768–70 (1947), can also be improved in stability by subjecting them to the freezing and thawing treatment.

The following examples in which parts are by weight are illustrative of the invention.

Example I

Alumina hydrate was prepared by dissolving 400 g. of $AlCl_3.6H_2O$ in 5600 cc. of water and pouring this solution rapidly into 1000 cc. of dilute ammonium hydroxide solution containing 341 cc. of concentrated (28%) ammonium hydroxide. The pH of the suspension obtained in this way was 8.0. The precipitate was filtered and washed on four 10 inch Buchner funnels until six liters of mother liquor and wash water had been collected in the receiving flask from each funnel. The chloride content of the product indicated that 96.4% of the chloride was removed in the washing. The washed filter cake containing the remainder of the chloride was slurried to give a crude suspension and heated with stirring at 95° C. for two hours. The crude suspension became translucent in appearance during the heat treatment and took on the properties of a colloidal sol. The sol was then subjected to a strong shearing action in a colloid mill to complete the dispersion. The resulting sol contained 5.8% by weight of solids as determined by drying and igniting a sample of the liquid. It contained 4.5 g. chlorine per liter, which is equivalent to 3.6% of the theoretical amount required to form $AlCl_3$. The pH of the sol was 4.7.

The alumina sol prepared by the above method which is that of Example I of copending application of Max Frederick Bechtold and Henry Moroni Stark, Serial No. 27,277 filed of even date herewith, was subjected to a temperature of −20° C. for seven hours and was then allowed to warm up to room temperature (20–25° C.) over a period of several hours without external heating. The alumina sol thus formed was very stable to changes in viscosity after this freezing-thawing treatment. When stored at room temperature the change in viscosity of the alumina sol prepared in accordance with this invention was much less than for a sol which had not been subjected to the freezing treatment and was about equivalent to that of a sol which was stored at a temperature just above freezing. This is illustrated by the following table:

| Sample | Cold Treatment | Subsequent Storage | Viscosity at 25° C. after Storage |
|---|---|---|---|
| A | Frozen at −20° C./7 hours; thawed at room temp. | 6 weeks—room temp. | Cp. 17.6 |
| B | None | 6 weeks—room temp. | 206.0 |
| C | ___do___ | 6 weeks—(3 to 4° C.) | 23.5 |

Example II

An alumina sol prepared in accordance with the procedure of Example I prior to the freezing treatment, and which had formed a clear gel on standing at room temperature, was reconverted to the sol form by subjecting the gel to a temperature of −20 to −25° C. for about sixty hours and then allowing the frozen solid to return to room temperature. The sol thus obtained possessed good film-forming properties. It was less viscous than before gelation and was stable toward gelation on standing at room temperature.

Example III

An alumina sol prepared in accordance with the procedure of Example I was frozen by subjecting the container and contents to the temperature of a solid carbon dioxide-acetone mixture until the liquid had solidified. The dispersion was thawed in hot water. The sol obtained in accordance with this procedure showed less turbidity than a similar sol which had not been subjected to the freezing treatment.

This invention is applicable either to freshly formed peptized alumina sols or to plastic alumina gels formed by the gelation of unstable peptized alumina sols. The plastic gels require the application of definite force to promote flow (Alexander-Colloid Chemistry, 1946, page 287). The plastic alumina gels of this character can be reconverted to sols of increased stability by subjecting them to freezing temperatures for a sufficient period to convert the dispersion in gel form to a rigid solid and then thawing by heating above the freezing point until the sol is reformed.

The freezing-thawing treatment of the alumina dispersions is effective in the concentration range of about 1 to 10% inclusive but is most beneficial when applied to sols or gels in the range of concentration of about 2 to 6% by weight of $Al_2O_3$. The non-elastic gels of higher $Al_2O_3$ content, for example those produced by evaporation of water from more dilute sols, are not completely peptized by the freezing and thawing process.

In general, temperatures from slightly below 0° to −25° C. and lower are satisfactory. The temperature must be low enough to cause formation of a rigid solid mass from the aqueous sol or gel. The period of time during which the alumina dispersion is subjected to the freezing temperature must be of sufficient duration so that a rigid solid mass is formed from the dispersion. The thawing treatment can be slow or rapid, depending upon the rate of heating.

The process of this invention is useful in stabilizing peptized colloidal alumina sols against slow gelation and change in viscosity on standing. The process of freezing an aqueous, gelled, peptized, colloidal alumina and then thawing to reconvert it to a sol is useful in recovering and salvaging colloidal materials which have become useless for the usual purposes of fluid sols by gelation.

The stable alumina sols of this invention can be used as binders for inorganic materials, e. g., glass, mica, tile, etc. They can be used as agents for treatment of paper to improve its wet strength, as sizes for paper in making paper laminates, as warp sizes for nylon and other fibers, and as anti-snag agents for nylon hosiery. They can also be used as ingredients of water paints to improve hardness of finish, as a mordant in color photography compositions, and as agents for the fixation of dyes on paper.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for preparing colloidal aqueous sols of alumina hydrate of increased stability against slow gelation and change of viscosity which comprises freezing a peptized, visually homogeneous, colloidal aqueous dispersion containing 1 to 10% $Al_2O_3$ as alumina hydrate to a rigid solid mass and then thawing said mass.

2. A process for preparing colloidal aqueous sols of alumina hydrate of increased stability against slow gelation and change of viscosity which comprises freezing a peptized, visually homogeneous, colloidal aqueous dispersion containing 2 to 6% $Al_2O_3$ as alumina hydrate to a rigid solid mass and then thawing said mass.

3. An alumina hydrate sol of increased stability against slow gelation and change of viscosity obtained by the process of claim 1.

4. An alumina hydrate of increased stability against slow gelation and change of viscosity obtained by the process of claim 2.

HENRY MORONI STARK.

REFERENCES CITED

The following references are of record in the file of this patent:

UNITED STATES PATENTS

| Number | Name | Date |
|---|---|---|
| 2,085,129 | Stoewener | June 29, 1937 |
| 2,397,218 | Sturgeon | Mar. 26, 1946 |

Certificate of Correction

Patent No. 2,560,707 — July 17, 1951

HENRY MORONI STARK

It is hereby certified that error appears in the printed specification of the above numbered patent requiring correction as follows:

Column 2, lines 10 and 11, for "become" read *became*; line 24, for "Serial No. 27,277" read *Serial No. 28,277*;

and that the said Letters Patent should be read as corrected above, so that the same may conform to the record of the case in the Patent Office.

Signed and sealed this 25th day of September, A. D. 1951.

[SEAL]

THOMAS F. MURPHY,
*Assistant Commissioner of Patents.*